(12) United States Patent
Ruzanski et al.

(10) Patent No.: US 10,489,923 B2
(45) Date of Patent: Nov. 26, 2019

(54) ESTIMATING CONDITIONS FROM OBSERVATIONS OF ONE INSTRUMENT BASED ON TRAINING FROM OBSERVATIONS OF ANOTHER INSTRUMENT

(71) Applicant: Vaisala, Inc., Louisville, CO (US)

(72) Inventors: Evan Ruzanski, Boulder, CO (US);
Kevin Petty, Louisville, CO (US);
Haiming Tan, Fort Collins, CO (US);
Cosima Jackson, Boulder, CO (US)

(73) Assignee: Vaisala, Inc., Louisville, CO (US)

( * ) Notice: Subject to any disclaimer, the term of this patent is extended or adjusted under 35 U.S.C. 154(b) by 73 days.

(21) Appl. No.: 15/841,060

(22) Filed: Dec. 13, 2017

(65) Prior Publication Data

US 2019/0180458 A1 Jun. 13, 2019

(51) Int. Cl.
| | | |
|---|---|---|
| *G06T 7/40* | (2017.01) | |
| *G06K 9/00* | (2006.01) | |
| *G06K 9/66* | (2006.01) | |
| *G01B 11/30* | (2006.01) | |

(52) U.S. Cl.
CPC ............ *G06T 7/40* (2013.01); *G01B 11/303* (2013.01); *G06K 9/00791* (2013.01); *G06K 9/66* (2013.01); *G06T 2207/30192* (2013.01)

(58) Field of Classification Search
CPC . G06T 2207/20081; G06T 2207/20084; G06T 2207/10024; G06T 17/05; G06T 7/70; G06T 2207/30196; G06T 2207/30256; G06T 2219/004; G06T 7/55; G06T 2207/30192; G06T 3/4046; G06T 7/33; G06T 7/344; G06T 7/40; G06T 7/97; G06K 9/00791; G06K 9/66
See application file for complete search history.

(56) References Cited

U.S. PATENT DOCUMENTS

| | | | |
|---|---|---|---|
| 7,912,246 B1 * | 3/2011 | Moon | G06K 9/00221 382/103 |
| 8,160,811 B2 | 4/2012 | Prokhorov | |
| 8,682,812 B1 * | 3/2014 | Ranjan | H04L 63/1425 706/12 |
| 9,183,509 B2 * | 11/2015 | Frank | G06F 3/013 |
| 9,401,089 B2 | 7/2016 | Drobot et al. | |
| 9,411,072 B1 | 8/2016 | Dixon | |
| 9,686,451 B2 | 6/2017 | Pillai et al. | |

(Continued)

FOREIGN PATENT DOCUMENTS

WO WO-2018225064 A1 * 12/2018 ............ G05B 15/00

*Primary Examiner* — Jingge Wu
(74) *Attorney, Agent, or Firm* — Maschoff Brennan; Paul G. Johnson

(57) ABSTRACT

Systems and methods are disclosed to label data collected by one instrument based on data collected by another instrument, train a computer learning model with the labeled data, and then use the trained computer learning model to estimate a condition from new unlabeled data. For example, weather-related pavement conditions may be estimated from camera images according to such systems and methods. Systems and methods are also disclosed to estimate road weather safety or hazard conditions using two different types of pavement conditions, such as road state and friction or grip coefficient, estimated from unlabeled camera images.

24 Claims, 9 Drawing Sheets

(56) References Cited

U.S. PATENT DOCUMENTS

| | | | |
|---|---|---|---|
| 2011/0010319 A1* | 1/2011 | Harada | G06K 9/00664 |
| | | | 706/12 |
| 2015/0224925 A1* | 8/2015 | Hartmann | B60R 1/00 |
| | | | 348/148 |
| 2016/0086285 A1 | 3/2016 | Peters et al. | |
| 2016/0371431 A1* | 12/2016 | Haque | G16B 20/00 |
| 2017/0006261 A1* | 1/2017 | Debilde | H04N 7/18 |
| 2018/0136332 A1* | 5/2018 | Barfield, Jr. | G01S 17/42 |
| 2018/0322660 A1* | 11/2018 | Smith | G06K 9/6267 |

* cited by examiner

ESTIMATING CONDITIONS FROM OBSERVATIONS OF ONE INSTRUMENT BASED ON TRAINING FROM OBSERVATIONS OF ANOTHER INSTRUMENT

FIELD

Some embodiments disclosed herein relate to estimating conditions from observations of one instrument based on training from observations of another instrument.

BACKGROUND

Unless otherwise indicated herein, the materials described herein are not prior art to the claims in the present application and are not admitted to be prior art by inclusion in this section.

Accurate, timely, and cost-effective real-time estimates of pavement conditions are useful for safety and operational efficiency, as well as optimizing resources in both roadway and airport operations. Some image-based methods to estimate pavement conditions exist that require significant human intervention, feature extraction, specific lighting, specific camera orientation, and/or other specific configurations, which individually and/or collectively may be slow and/or expensive. Accordingly, such image-based methods to estimate pavement conditions may be inadequate.

The subject matter claimed herein is not limited to embodiments that solve any disadvantages or that operate only in environments such as those described above. Rather, this background is only provided to illustrate one example technology area where some embodiments described herein may be practiced.

SUMMARY OF THE DISCLOSURE

Systems and methods are disclosed to label data collected by one instrument (e.g., a second instrument) based on data collected by another instrument (e.g., a first instrument). In general, the labeled data may then be used to train a computer learning model without the necessity of specific feature extraction. New unlabeled data from the second instrument may be analyzed by the trained computer learning model which may then estimate a condition, such as a classification (state or category) or regression (numerical value) from the new unlabeled data. As a specific example, such systems and methods may be leveraged to estimate weather-related pavement conditions from camera images.

In an example embodiment, a method may include accessing a first data set generated by a first instrument and a second data set generated by a second instrument different than the first instrument. The first data set may include first observations by the first instrument of a subject under observation. The second data set may include second observations by the second instrument of the subject. The first observations may be of a different type than the second observations and may include conditions of the subject at (or at least temporally near) points in time at which the first observations are made. Each condition of the subject at a corresponding point in time at which the corresponding first observation is made may be selected from a set of possible conditions. The method may also include automatically labeling the second data set based on the first data set. The method may also include training a computer learning model with the labeled second data set to recognize complex relationships between the second observations and conditions in the set of possible conditions. The method may also include analyzing, with the trained computer learning model, a third data set that includes a third observation by the second instrument of the subject. Based on the analysis, the method may also include estimating a condition of the subject in the third observation, the estimated condition selected from the set of possible conditions.

In another example embodiment, a system may include a first data set, a second data set, and a computer learning model. The first data set may be generated by a first instrument. The first data set may include first observations by the first instrument of a subject under observation. The first observations may include conditions of the subject at points in time at which the first observations are made. Each condition of the subject at the corresponding point in time at which the corresponding first observation is made may be selected from a set of possible conditions. The second data set may be generated by a second instrument different than the first instrument. The second data set may include second observations by the second instrument of the subject. The first observations may be of a different type than the second observations. The second data set may be labeled based on the first data set. The computer learning model may have access to the first data set and the second data set. The computer learning model may be trainable with the first data set and the second data set to recognize complex relationships between the second data set and conditions in the set of possible conditions. The trained computer learning model may be configured to analyze a third data set that includes a third observation by the second instrument of the subject and estimate a condition of the subject based on the analysis.

In another example embodiment, a method to estimate road weather safety or hazard conditions may include estimating, from an image of pavement in an environment, a pavement state of the pavement. The method may also include estimating, from the image of the pavement, a friction or grip coefficient of the pavement. The method may also include determining a pavement weather safety classification of the pavement based on both the estimated pavement state and the estimated friction or grip coefficient.

These example embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Embodiments described herein relate to systems and methods to label data collected by one instrument based on data collected by another instrument, train a computer learning model with the labeled data, and then use the trained computer learning model to estimate a condition from new unlabeled data. A specific example implementation of the foregoing may estimate pavement conditions from camera images. Some aspects of some disclosed embodiments include the absence of human intervention in the pavement condition estimation process or other condition estimation process, the ability to use raw and complete image data in both training and deployment, and the completely automated labeling of model training data using a remote or in-situ sensor.

The detailed description set forth below includes a description of various configurations of the subject technology and is not intended to represent the only configurations in which the subject technology may be practiced. The detailed description includes specific details for the purpose of providing a thorough understanding of the subject technology. However, the subject technology may be practiced without these specific details. In some instances, well-known structures and components are not shown, or are shown schematically, to avoid obscuring the concepts of the subject technology.

Figure 1A:
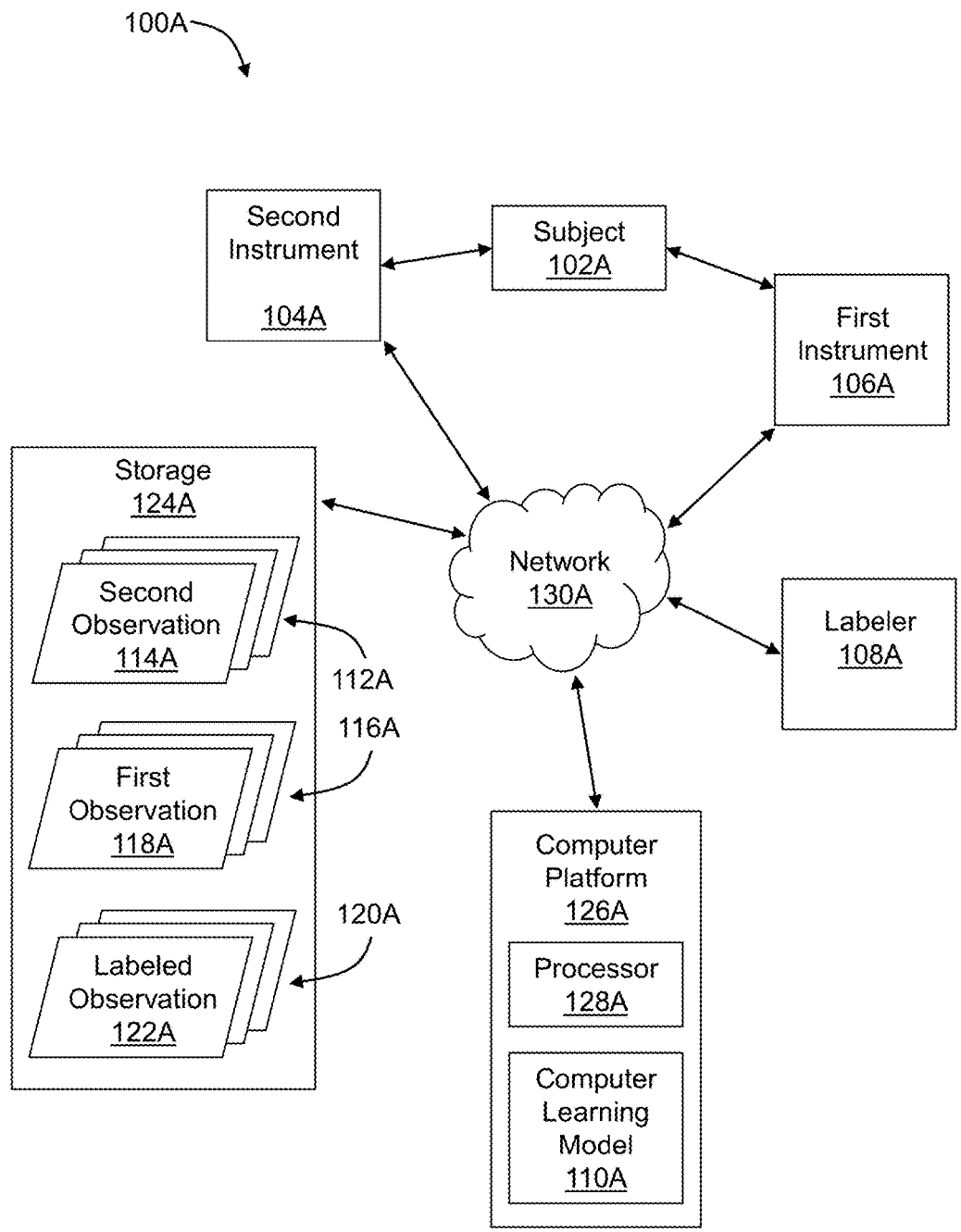
FIG. 1A illustrates an example system for using labeled data labeled with conditions from other data to train a computer learning model to estimate conditions of unlabeled data.

FIG. 1A illustrates an example system 100A for using labeled data labeled with conditions from other data to train a computer learning model to estimate conditions of unlabeled data, arranged in accordance with at least one embodiment described herein. The system 100A may include one or more of a first instrument 106A, a second instrument 104A, a labeler 108A, a computer learning model 110A, a first data set 116A including first observations 118A generated by the first instrument 106A of a subject 102A under observation, and/or a second data set 112A including second observations 114A generated by the second instrument 104A of the subject 102A. Alternatively or additionally, the system 100A may include a labeled second data set 120A including the second observations 114A labeled with the first observations 118A (referred to individually as labeled observations 122A), an archive or storage device or system 124A (hereinafter "storage 124A"), a computer platform 126A, a processor 128A, and/or a network 130A.

The subject 102A may include an object such as pavement, a vehicle, a building, or other object in an environment, atmosphere at a particular location, an Automated Surface Observation Station (ASOS) site, or other subject under observation.

In general, each of the first and second instruments 106A and 104A may separately observe the subject 102A and make (and/or output) first or second observations 118A, 114A of the subject 102A. The observations can include measurements of the subject, such as camera images, radar images, satellite images, pavement conditions, precipitation measurements, light measurements, and/or other observations of the subject 102A.

Each of the first and second observations 118A, 114A may be captured at a point in time that may be known and/or determined. A first observation 118A captured at a time that is nearest in time to or within a threshold duration of time at which a second observation 114A is captured may be referred to as being temporally near to the second observation 114A.

The labeler 108A or other entity in the system 100A may be configured to access each of the first and second observations 118A and 114A and identify, for each of the second observations 114A, a corresponding one of the first observations 118A that is temporally near to each second observation 114A. The labeler 108A may then label each of the second observations 114A with a corresponding one of the first observations 118A and/or a corresponding condition included in the first observation 118A to generate the labeled observations 122A.

The computer learning model 110A may be trained with the labeled second data set 120A, and/or by the second data set 112A and the first data set 116A, to recognize complex relationships between the second observations 114A and conditions included in the first observations 118A. The relationships may be too complex to be recognized and leveraged properly by humans. Some computer learning models require humans to select specific features from the second data set 112A for analysis that are believed to be related to conditions included in or derived from the first observations 118A in the first data set 116A. Such relationships may be too simplistic, may overestimate the effect of selected features, and/or may fail to recognize the effect of other non-selected features In comparison, embodiments described herein may rely on the computer learning model 110A to recognize the complex relationships between the second data set 112A, and more particularly specific features of the second data set 112A and/or second observations 114A, and measured conditions included in or derived from the first observations 118A where the relationships may be too complex for humans to recognize.

The system 100A of FIG. 1A may have broad applicability to numerous different specific applications, some of which will be described. For example, the subject 102A may include an outside environment with an atmosphere and a surface in the environment. The first instrument 106A may include a surface precipitation gauge to measure liquid water equivalent values at the surface as the first observations 118A. The second instrument 104A may include a camera, radar, or satellite to generate images of the atmosphere and/or other aspects of the subject 102A as the second observations 114A. The images may be labeled with the liquid water equivalent values to generate the labeled second data set 120A. The computer learning model 110A may be trained with the images labeled with the liquid water equivalent values to recognize complex relationships between features in the images and the liquid water equivalent values. The trained computer learning model 110A may then analyze new images from the camera, radar, or satellite and estimate a liquid water equivalent value of the subject 102A from the image alone and without a corresponding first observation 118A.

As another example, the subject 102A may include an outside environment with an atmosphere and a surface in the environment. The first instrument 106A may include a surface lighting sensor to measure lighting (e.g., light levels) in the environment, or light measurements, as the first observations 118A. The second instrument 104A may include a camera, radar, or satellite to generate images of the atmosphere and/or other aspects of the subject 102A as the second observations 114A. The images may be labeled with the light measurements to generate the labeled second data set 120A. The computer learning model 110A may be trained with the images labeled with the light measurements to recognize complex relationships between features in the images and the light measurements. The trained computer learning model 110A may then analyze new images from the camera, radar, or satellite and estimate a light measurement and/or impending lightning activity in the environment from the image alone and without a corresponding first observation 118A.

As another example, the subject 102A may include an ASOS site in an external environment. The first instrument 106A may include an ASOS to generate ASOS observations as the first observations 118A. The second instrument 104A may include an imaging device mounted to an aircraft (manned or unmanned) that flies over the ASOS site to generate images of the ASOS site as the second observations 114A. The images may be labeled with the ASOS observations to generate the labeled second data set 120A. The computer learning model 110A may be trained with the images labeled with the ASOS observations to recognize complex relationships between features in the images and the ASOS observations. The trained computer learning model 110A may then analyze new images from the imaging device and estimate an ASOS observation of the ASOS site from the image alone and without a corresponding first observation 118A (e.g., an actual ASOS observation from an ASOS).

As yet another example, a specific application of the system 100A that involves image-based estimation of pavement conditions will be described with respect to FIG. 1B.

Figure 1B:
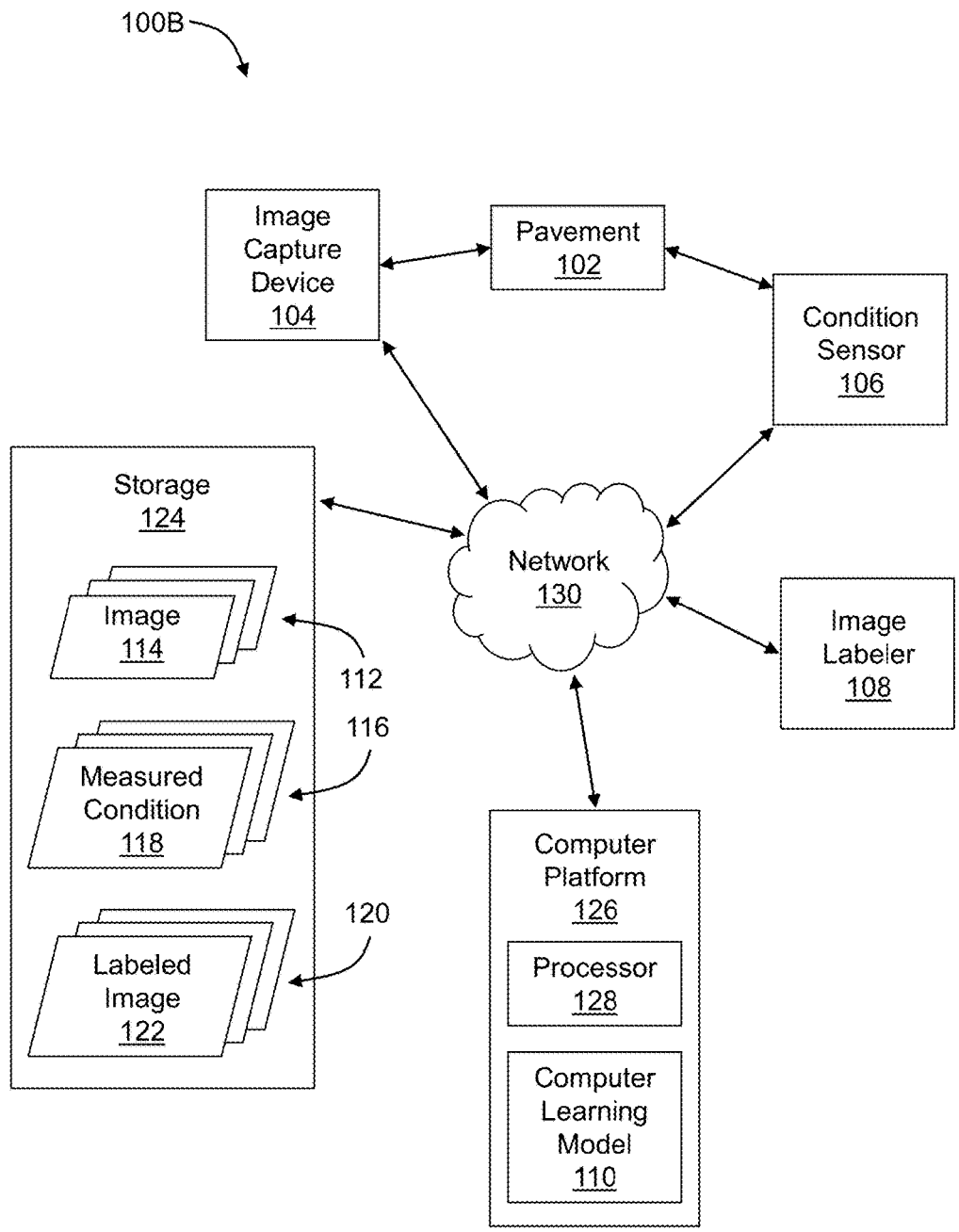
FIG. 1B illustrates an example system for image-based estimation of weather-related pavement conditions of pavement.

FIG. 1B illustrates an example system 100B for image-based estimation of weather-related pavement conditions of pavement 102, arranged in accordance with at least one embodiment described herein. The system 100B may include one or more of an image capture device 104, a condition sensor 106, an image labeler 108, a computer learning model 110, a set 112 of images 114 (collectively "image set 112"), and/or a set 116 of measured pavement conditions 118 (collectively "condition set 116"). Alternatively or additionally, the system 100B may include a set 120 of labeled images 122 (collectively "labeled image set 120"), an archive or storage device or system 124 (hereinafter "storage 124"), a computer platform 126, a processor 128, and/or a network 130.

The pavement 102 of FIG. 1B is an example of the subject 102A of FIG. 1A. The condition sensor 106 of FIG. 1B is an example of the first instrument 106A of FIG. 1A. The image capture device 104 of FIG. 1B is an example of the second instrument 104A of FIG. 1A. The image labeler 108 of FIG. 1B is an example of the labeler 108A of FIG. 1A. The computer learning model 110 of FIG. 1B is an example of the computer learning model 110A of FIG. 1A. The image set 112 of FIG. 1B is an example of the second data set 112A of FIG. 1A. The images 114 of FIG. 1B are examples of the second observations 114A of FIG. 1A. The condition set 116 of FIG. 1B is an example of the first data set 116A of FIG. 1A. The measured pavement conditions 118 of FIG. 1B are examples of the first observations 118A of FIG. 1A. The labeled image set 120 of FIG. 1B is an example of the labeled second data set 120A of FIG. 1A. The labeled images 122 of FIG. 1B are examples of the labeled observations 122A of FIG. 1A. Each of the storage 124, the computer platform 126, the processor 128, and the network 130 of FIG. 1B is an example of the storage 124A, the computer platform 126A, the processor 128A, and the network 130A of FIG. 1A.

Each of the components and data of FIG. 1B will be discussed in some detail in the discussion that follows. The corresponding components and data of FIG. 1A may be implemented in the same, similar, or analogous manner and one of ordinary skill in the art will appreciate how to modify the components and/or data of FIG. 1B to be more general as in FIG. 1A and/or for different applications, some of which are briefly mentioned above or elsewhere herein.

Referring to FIG. 1B, the pavement 102 may be located in an external environment and may include asphalt, concrete, or similar surfacing over which vehicles, such as automobiles and aircraft, may travel. Accordingly, the pavement 102 may be exposed to water, e.g., in the form of humidity, rain, snow, hail, ice, melt-off, or other types or forms of water, varying temperatures, wind, and/or other factors that may affect a condition of the pavement 102 in a way that may be relevant to the vehicles that travel on the pavement 102. For instance, qualitatively the pavement 102 may be relatively less slippery for vehicles traveling thereon when dry, may be relatively more slippery when wet, and may be relatively more slippery still when covered with snow and/or ice. Alternatively or additionally, quantitatively the pavement 102 may have a higher grip coefficient for vehicles traveling thereon when dry where the grip coefficient may be less when the pavement 102 is wet or covered by snow and/or ice.

The image capture device 104 may be located in a vicinity of the pavement 102, at least at a time when the image capture device 104 captures images 114 of the pavement 102. For instance, the image capture device 104 may be located within 5, 10, 15, 20, 25, 30, 35, 40, 45, or 50 feet or more of the pavement 102. More generally, the image capture device 104 may be located not more than a threshold distance from the pavement 102, within which the image capture device 104 may capture images 114 of the pavement 102. The images 114 and other images captured by the image capture device 104 may be timestamped or may otherwise be associated with a time of capture of the corresponding image 114. The time of capture may be determined and/or associated with each corresponding image 114 by the image capture device 104 or other suitable system or device.

The image capture device 104 may be mounted to a vehicle or may otherwise be mobile. Alternatively, the image capture device 104 may be mounted to a stationary structure such as a building, road signage, an overpass, or may otherwise be fixed or stationary.

The image capture device 104 may include any device suitable to capture images of the pavement 102. For instance, the image capture device 104 may include a camera, a charge coupled device (CCD), or other suitable image capture device.

Images 114 and/or other images captured by the image capture device 104 may include the pavement 102 and optionally other features in the external environment apart from the pavement 102. For instance, one or more of the images 114 and/or other images captured by the image capture device 104 may include, in addition to the pavement 102, one or more of surrounding terrain, sky, foot traffic, vehicle traffic, or other features in the external environment apart from the pavement 102. Alternatively or additionally, the images 114 and/or other images used herein may include various lighting conditions, e.g., the images 114 and/or other images used herein do not require consistent lighting conditions. Inclusion of the pavement 102, traffic, and/or surrounding areas in the images 114 and/or other images used herein may give visual context of the scene for enhanced driver situational awareness versus a view of only the road surface that would result from, e.g., pointing the image capture device 104 directly at a small section of the pavement 102 as is done in some other image-based weather-related pavement condition estimation methods. As such, computers and humans may both be able to process the same information, at least at a high level.

The condition sensor 106 may be located in a vicinity of the pavement 102. For instance, the image capture device 104 may be located in the pavement 102, or within 5, 10, 15, 20, 25, 30, 35, 40, 45, or 50 feet or more of the pavement 102. More generally, the condition sensor 106 may be located in, at, or not more than a threshold distance from the pavement 102 such that the condition sensor 106 may measure pavement conditions of the pavement 102 to generate measured pavement conditions 118. The measured pavement conditions 118 generated by the condition sensor 106 may be timestamped or may otherwise be associated with a time of measurement of the corresponding measured pavement condition 118. The time of measurement may be determined and/or associated with each corresponding measured pavement condition 118 by the condition sensor 106 or other suitable system or device.

The condition sensor 106 may include an in situ sensor, e.g., a sensor that is located within the pavement 102, configured to detect pavement conditions in situ. Alternatively, the condition sensor 106 may include a remote sensor configured to detect pavement conditions of the pavement 102 remotely, although still within a vicinity of the pavement 102 so as to be able to make measurements of the pavement 102. The condition sensor 106 may measure temperature, humidity, moisture, grip coefficient (e.g., friction or coefficient of friction), or other parameter indicative of a condition of the pavement 102, which conditions may be referred to as pavement conditions.

The condition sensor 106 may be mounted to a vehicle or may otherwise be mobile. Alternatively, the condition sensor 106 may be installed in situ in the pavement 102, may be mounted to a stationary structure such as a building, road signage, an overpass, or may otherwise be fixed or stationary.

In these and other embodiments, the condition sensor 106 may include any suitable pavement condition sensor, such as a remote surface state sensor (such as the sensors marketed by VAISALA as DSC111 sensors), a humidity and temperature sensor (such as the sensors marketed by VAISALA as HMT310 sensors), a mobile road weather sensor (such as the sensors marketed by Teconer Ltd as RCM411 sensors), a road status and/or friction sensor (such as the sensors marketed by MetSense as 2DRoad sensors, MetRoadMobile sensors, and MetRoad sensors), a mobile road weather information sensor (such as the sensors marketed by Lufft as MARWIS sensors), a configurable pressure transducer (such as the transducers marketed by HONEYWELL as Model FP2000 transducers), an active road sensor (such as the sensors marketed by Lufft as ARS31 sensors), a passive road surface temperature sensor (such as the sensors marketed by Lufft as WST2 sensors), or other suitable condition sensors.

The measurements of the pavement 102 made by the condition sensor 106 may be quantitative or qualitative and/or categorical. For instance, the measured pavement conditions 118 may include grip coefficients or other quantitative measurements of the pavement 102 as the measured pavement condition, or a qualitative or categorical description of the pavement condition, such as Dry, Moist, Wet, Ice, Slush, Snow, or other categorical descriptor as the measured pavement condition.

The image labeler 108 may be configured to automatically (e.g., without human involvement) label the images 114 with corresponding measured pavement conditions 118 as labels to produce the labeled images 122. For instance, the image labeler 108 may determine, for each of the images 114, a time the image 114 was captured Based on the times of measurement of the measured pavement conditions 118, the image labeler 108 may then identify one of the measured pavement conditions 118 that was measured temporally near to the time of capture of the corresponding image 114A measured pavement condition 118 that is temporally near to an image 114 may refer to the measured pavement condition 118 with a time of measurement closest in time (compared to other measured pavement conditions 118) to the time of capture of the image 114. Alternatively or additionally, temporally near may refer to one or more measured pavement conditions 118 and/or an average thereof with a time of measurement within a threshold of the time of capture of the image 114.

The label included in each of the labeled images 122 may include or specify one or more of a label type (e.g., categorical pavement condition, grip coefficient, moisture level, temperature, humidity, or other type), a value of the measured pavement condition 118 (e.g., a numerical, categorical, or qualitative value) which in some cases may be selected from a range of possible values, an identification of the condition sensor 106 that generated the corresponding measured pavement condition 118, and/or other data. For instance, if the label type is a categorical pavement condition, the range of possible values for the measured pavement condition 118 included in the label may in some embodiments include Dry, Moist, Wet, Slush, Snow, Ice.

The image labeler 108 may be included as part of the image capture device 104, the condition sensor 106, and/or the computer learning model 110. Alternatively, the image labeler 108 may be implemented as a discrete component from the image capture device 104, the condition sensor 106, and the computer learning model 110. The image labeler 108 may include hardware, software, or a combination thereof. In an example embodiment, the image labeler 108 may include software executed by a processor to perform or control performance of operations described herein as being performed by the image labeler 108.

In other embodiments, the image labeler 108 and/or the condition sensor 106 may be omitted from the system 100B. In some embodiments, the images 114 may be labeled manually, e.g., by one or more humans, to generate the labeled images 122.

The computer learning model 110 may be trained with the labeled image set 120, and/or by image set 112 and the condition set 116, to recognize complex relationships between images and pavement conditions, e.g., between images and measured pavement conditions. The relationships may be too complex to be recognized and leveraged properly by humans. Some computer learning models require humans to select specific image features for analysis that are believed to be related to measured pavement conditions. Such relationships may be too simplistic, may overestimate the effect of selected image features, and/or may fail to recognize the effect of other non-selected image features. In comparison, embodiments described herein may rely on the computer learning model 110 to recognize the complex relationships between images, and more particularly specific image features, and measured pavement conditions where the relationships may be too complex for humans to recognize.

In these and other embodiments, the computer learning model 110 may include a convolutional neural network (CNN) or other suitable computer learning model 110. Accordingly, the computer learning model 110 may be specifically designed and amenable to implementations to accurately and efficiently learn patterns in digital image data without the need for manually selecting and extracting features from the imagery.

The computer learning model 110 may be executed on a computer platform 126 by a processor 128. The computer platform 126 may include a cloud-based computer architecture, a server computer, a rack-mounted server computer, a blade server computer, or other suitable hardware. The processor 128 may generally include any suitable processing device, such as a graphics processor unit (GPU), a processor, a microprocessor, a controller, a microcontroller, a field programmable gate array (FPGA), an application specific integrated circuit (ASIC), a digital signal processor (DSP), or other suitable processing device. Some implementations of CNNs leverage the architecture of GPUs such that the computer learning model 110 may be run on the processor 128 implemented as a GPU in the computer platform 126 implemented as a cloud-based architecture. The use of other methods and computing frameworks resulting from future developments and advancements in the state-of-the-art in computational learning and/or computing may be used instead as they become available.

The images 114 and other images used herein may in some embodiments include what can be considered "standard" imagery, e.g., images captured by a standard digital camera (e.g., the image capture device 104) without modifications to the lens, internal electronic circuitry, special orientation of viewing angle, or special lighting. In comparison, some other image-based weather-related pavement condition estimation methods require images captured by cameras with specific lenses, internal electronic circuitry, at special orientations of viewing angles, or special lighting. Embodiments described herein improve upon such image-based weather-related pavement condition estimation methods by dispensing with such specific and cumbersome image capture requirements which may permit capturing images of the pavement 102 at any time of day or night and/or under ambient lighting conditions. For instance, the images used for training the computer learning model 110 and/or from which pavement conditions are estimated may be illuminated by natural scenic ambient light from sources such as celestial bodies, streetlights, passing vehicle headlights, or other light sources.

The images 114 and other images used herein need not be ordered sequentially or have at least a minimum resolution. Alternatively or additionally, the images may include color or grayscale images. Furthermore, certain sections or features of such images need not be identified and extracted prior to training the computer learning model 110. Instead, the raw image data (e.g., images 114 of both the pavement 102 and one or more other features in the external environment) can be used for training. All other image-based weather-related pavement condition estimation methods of which the instant inventors are aware rely on some level of human image feature selection and extraction to reduce the size of the training data and attempt to choose the image characteristics best representative of the pavement condition. Such selections may be based on expert opinion and the specific type of pavement condition of interest (e.g., to determine if a particular road is wet, features representing darkness or shine on the pavement surface may be selected). These may not be numerically optimal or ubiquitously representative of pavement surface states.

In some embodiments, the image set 112, the condition set 116, the labeled image set 120, and/or other data may be stored in the storage 124. The storage 124 may include any non-transitory computer-readable storage medium. For instance, the storage 124 may include one or more of RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other non-transitory medium which may be used to store the desired information and which may be accessed by one or more of the image capture device 104, the condition sensor 106, the image labeler 108, and/or the computer learning model 110. The storage 124 may be part of one or more of the image capture device 104, the condition sensor 106, the image labeler 108, and/or the computer learning model 110 or may be separate therefrom.

The network 130 may include one or more wide area networks (WANs) and/or local area networks (LANs) that enable the image capture device 104, the condition sensor 106, the image labeler 108, the computer learning model 110, and/or the storage 124 to communicate with each other. In some embodiments, the network 130 includes the Internet, including a global internetwork formed by logical and physical connections between multiple WANs and/or LANs. Alternately or additionally, the network 130 may include one or more cellular RF networks and/or one or more wired and/or wireless networks such as, but not limited to, 802.xx networks, Bluetooth access points, wireless access points, IP-based networks, or the like. The network 130 may also include servers that enable one type of network to interface with another type of network.

Modifications, additions, or omissions may be made to the system 100B without departing from the scope of the present disclosure. For example, the system 100B may include any number of image capture devices 104 and/or condition sensors at any number of pavement 102 locations on the same or different roadways. For simplicity, embodiments described herein relate to a single pavement 102 location with a single image capture device 104 and a single condition sensor 106 in a vicinity thereof. Alternatively or additionally, multiple image capture devices 104 and/or multiple condition sensors 106 may be located in a vicinity of a single pavement 102 location.

Alternatively or additionally, the computer learning model 110 may receive training updates statically or dynamically by providing the computer learning model 110 with new labeled image sets. In a dynamic implementation, the computer learning model 110 may complete training updates, e.g., training with new labeled image sets, in real time or substantially in real time.

Figure 1C:
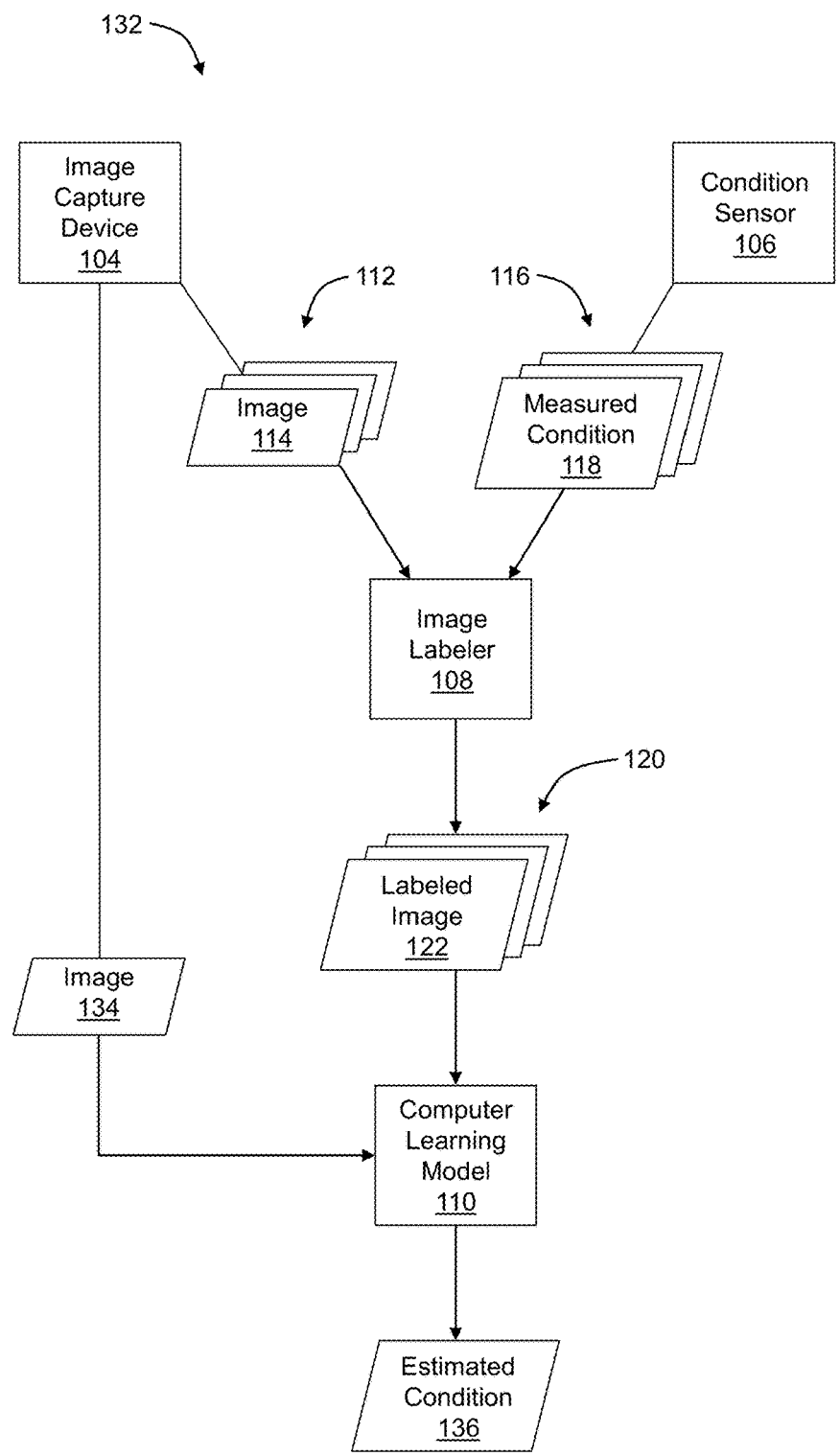
FIG. 1C illustrates an example method for image-based estimation of weather-related pavement conditions of the pavement in the system of FIG. 1B.

FIG. 1C illustrates an example method 132 for image-based estimation of weather-related pavement conditions of the pavement 102 in the system 100B of FIG. 1B, arranged in accordance with at least one embodiment described herein. As illustrated in FIG. 1C, the image capture device 104 may capture each of the images 114 of the pavement 102 (FIG. 1B) in the image set 112 while the condition sensor 106 may measure pavement conditions of the pavement 102 to generate each of the measured pavement conditions 118 in the condition set 116.

The image labeler 108 may access the image set 112 and the condition set 116 and may automatically label each of the images 114 with a corresponding temporally near measured pavement condition 118 to output the labeled images 122 of the labeled image set 120. Accordingly, the labeling of the images 114 with the measured pavement conditions 118 to output the labeled images 122 may involve data fusion of imagery data from the image capture device 104 and measured condition data from the condition sensor 106.

The image labeler 108 may access the image set 112 and the condition set 116 by receiving the image set 112 and the condition set 116 directly from the image capture device 104 and the condition sensor 106, respectively. Alternatively or additionally, the image labeler 108 may access one or both of the image set 112 or the condition set 116 on an archive such as the storage 124 of FIG. 1B.

The labeled image set 120 may be provided to the computer learning model 110 to train the computer learning model 110 to recognize complex relationships between the images 114, which may be included in the labeled images 122, and measured pavement conditions 118, which may also be included in the labeled images 122. The labeled image set 120 may be provided to the computer learning model 110 directly from the image labeler 108. Alternatively or additionally, the computer learning model 110 may access the labeled image set 120 on an archive such as the storage 124 of FIG. 1B.

The labeled image set 120 used to train the computer learning model 110 need not include or be derived from a continuous temporal sequence of images (e.g., video). Instead, the labeled image set 120 may include images sampled (e.g., randomly, pseudo-randomly, or otherwise) from an archived database and/or images subsampled from a video.

The trained computer learning model 110 may then analyze new images without labeling and may estimate pavement conditions of the new images. By way of example, the computer learning model 110 may analyze a new image 134 received from and/or captured by the image capture device 104 where the new image 134 has not been labeled with a pavement condition. Based on, e.g., the complex relationships between the images 114, including specific features recognized by the computer learning model 110 as relevant to the relationships, and the measured pavement conditions 118 the computer learning model 110 is trained to recognize, the computer learning model 110 may estimate a pavement condition 136 ("Estimated Condition 136" in FIG. 1C) of the new image 134.

In some embodiments, the possible values of the estimated pavement condition 136 may be any of the possible values of the measured pavement conditions 118. In other embodiments, possible values of the estimated pavement condition 136 may include only a subset, or variations thereof, of the possible values of the measured pavement conditions 118. For instance, if the possible values of the measured pavement conditions 118 include Dry, Moist, Wet, Slush, Snow, and Ice, the possible values of the estimated pavement condition 136 may be reduced to Dry and Wet, or Dry and Not Dry.

Accordingly, the system 100B of FIG. 1B and the method 132 of FIG. 1C are specific examples of systems and methods to label data collected by one instrument based on data collected by another instrument, train a computer learning model with the labeled data, and then use the trained computer learning model to estimate a condition from new unlabeled data.

Figure 2A:
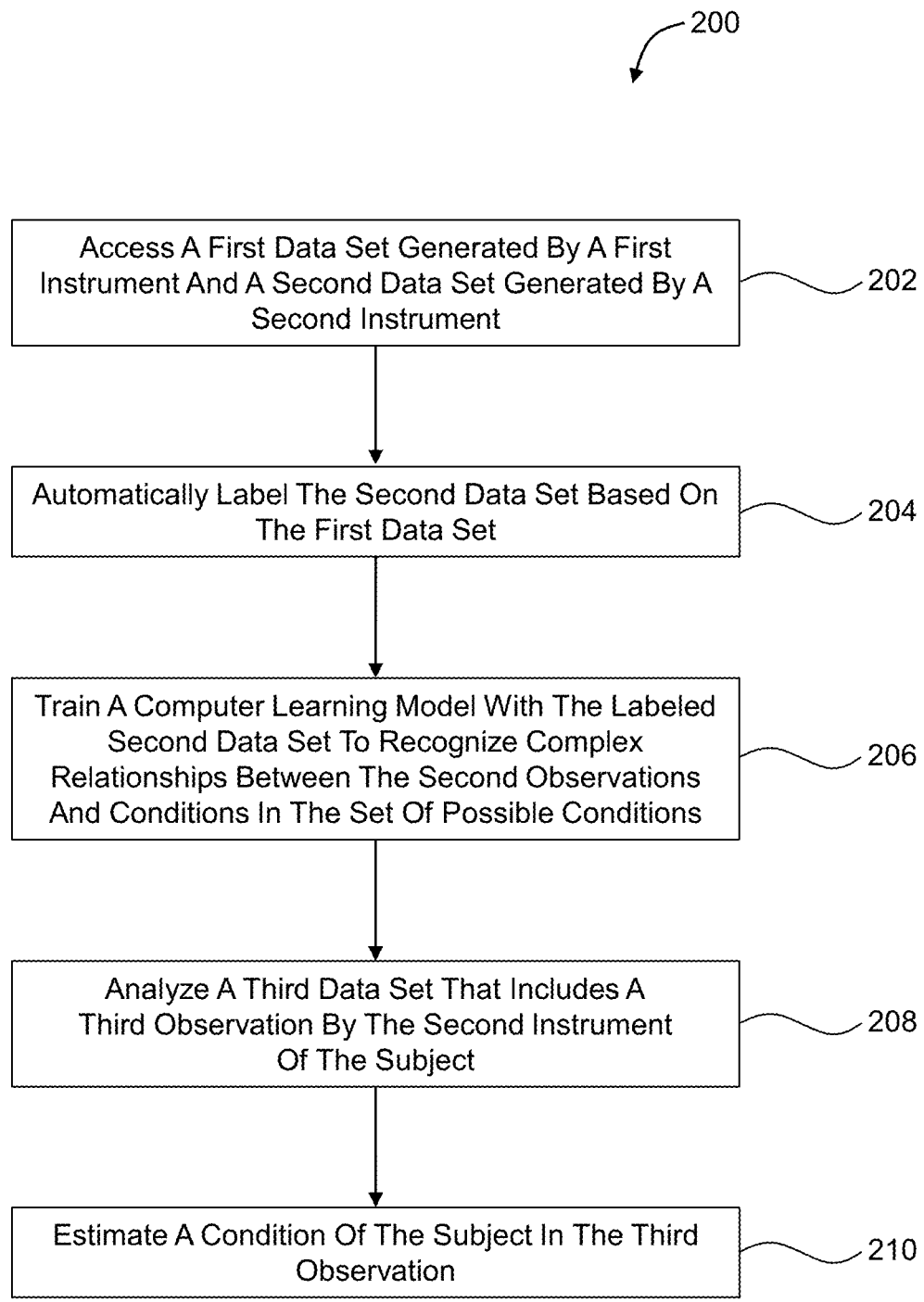
FIG. 2A is a flowchart of an example method to label data collected by one instrument based on data collected by another instrument, train a computer learning model with the labeled data, and then use the trained computer learning model to estimate a condition from unlabeled data.

FIG. 2A is a flowchart of an example method 200, arranged in accordance with at least one embodiment described herein. The method 200 may be implemented to label data collected by one instrument based on data collected by another instrument, train a computer learning model with the labeled data, and then use the trained computer learning model to estimate a condition from new unlabeled data. The method 200 may correspond to the method 132 of FIG. 1C, e.g., as a more general implementation thereof. The method 200 may be performed, in whole or in part, in the systems 100A and 100B of FIGS. 1A and 1B and/or in other systems, devices, and/or configurations. Alternatively or additionally, some or all of the method 200 may be controlled by a computer or processor device, such as the processor 128A, 128 of FIGS. 1A and 1B or the computing device 500 or processor 504 of FIG. 5. The method 200 may include one or more of blocks 202, 204, 206, 208, and/or 210. The method 200 may begin at block 202.

At block 202 ["Access A First Data Set Generated By A First Instrument And A Second Data Set Generated By A Second Instrument"], a first data set generated by a first instrument and a second data set generated by a second instrument different than the first instrument may be accessed. The first data set may include first observations by the first instrument of a subject under observation. The second data set may include second observations by the second instrument of the subject. The first observations may be of a different type than the second observations and may include conditions of the subject at points in time at which the first observations are made. For example, the first observations may include pavement conditions, liquid water equivalent value measurements, light measurements, ASOS measurements, or other measurements, while the second observations may include images of the pavement, images of the atmosphere, images of an ASOS site, or other measurements. Each condition of the subject at a corresponding point in time at which the corresponding first observation is made may be selected from a set of possible conditions. Block 202 may be followed by block 204.

At block 204 ["Automatically Label The Second Data Set Based On The First Data Set"], the second data set may be automatically labeled based on the first data set. Automatically labeling the second data set based on the first data set may include automatically labeling each second observation with the corresponding condition of the subject included in a corresponding one of the first observations made temporally near in time to the second observation. Block 204 may be followed by block 206.

At block 206 ["Train A Computer Learning Model With The Labeled Second Data Set To Recognize Complex Relationships Between The Second Observations And Conditions In The Set Of Possible Conditions"], a computer learning model may be trained with the labeled second data set to recognize complex relationships between the second observations and conditions in the set of possible conditions. The training at block 206 may include training the computer learning model with the set of images of the pavement in the environment, each image in the set of images labeled with a corresponding pavement condition in the set of pavement conditions, to recognize complex relationships between the set of images and the set of pavement conditions. Alternatively or additionally, the training at block 206 may include training the computer learning model with raw image data. For instance, training the computer learning model with raw image data may include at least one of: training the computer learning model with images that are unmodified from their captured states; training the computer learning model with images that include both the pavement and other features in the environment apart from the pavement, or training the computer learning model without identifying or extracting features of the images prior to the training. Alternatively or additionally, the training at block 206 may include training a CNN configured to accurately and efficiently learn patterns in digital image data of the set of images without prior manual selection and extraction of features from the digital image data. Block 206 may be followed by block 208.

At block 208 ["Analyze A Third Data Set That Includes A Third Observation By The Second Instrument Of The Subject"], a third data set that includes a third observation by the second instrument of the subject may be analyzed with the trained computer learning model. As an example, the analyzing may include analyzing a new image of the pavement in the environment with the trained computer learning model. Block 208 may be followed by block 210.

At block 210 ["Estimate A Condition Of The Subject In The Third Observation"], a condition of the subject in the third observation may be estimated by the computer learning model. Estimating the condition in the third observation at block 210 may include, e.g., estimating a liquid water equivalent value of the subject from a new image of the atmosphere, estimating impending lightning activity in the atmosphere of the subject from a new image of the atmosphere, estimating an ASOS observation of the ASOS site from a new image of the ASOS site, or estimating a pavement condition of the pavement in a new image based on the analysis.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 2B:
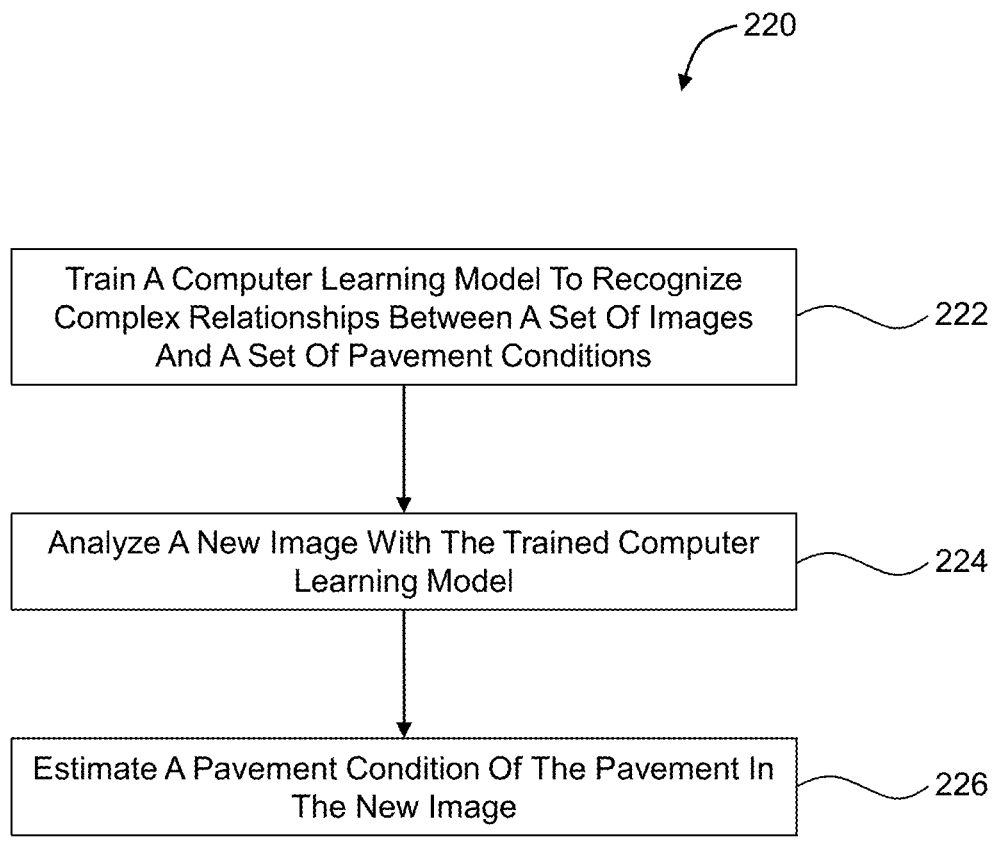
FIG. 2B is a flowchart of an example method to estimate weather-related pavement conditions from camera images.

FIG. 2B is a flowchart of an example method 220 to estimate weather-related pavement conditions from camera images, arranged in accordance with at least one embodiment described herein. The method 220 may include or correspond to the method 132 of FIG. 1C and/or to all or at least a portion of the method 200 of FIG. 2A as a more specific implementation thereof. The method 220 may be performed, in whole or in part, in the system 100B of FIG. 1B and/or in other systems, devices, and/or configurations. Alternatively or additionally, some or all of the method 220 may be controlled by a computer or processor device, such as the processor 128A, 128 of FIGS. 1A and 1B or the computing device 500 or processor 504 of FIG. 5. The method 220 may include one or more of blocks 222, 224, and/or 226. The method 220 may begin at block 222.

At block 222 ["Train A Computer Learning Model To Recognize Complex Relationships Between A Set Of Images And A Set Of Pavement Conditions"], a computer learning model may be trained with a set of images of pavement in an environment, each image in the set of images labeled with a corresponding pavement condition in a set of pavement conditions, to recognize complex relationships between the set of images and the set of pavement conditions.

Training the computer learning model with the set of images may include training the computer learning model with raw image data. Training the computer learning model with raw image data may include at least one of: training the computer learning model with images that include both the pavement and other features in the environment apart from the pavement; or training the computer learning model without identifying or extracting features of the images prior to the training. In these and other embodiments, the raw image data may include at least one of: images that include both the pavement and other features in the environment apart from the pavement; or unprocessed image data devoid of extracted features. The other features in the environment apart from the pavement may include one or more of surrounding terrain, sky, foot traffic, or vehicle traffic.

Alternatively or additionally, training the computer learning model with the set of images may include training a CNN configured to accurately and efficiently learn patterns in digital image data of the set of images without prior manual selection and extraction of features from the digital image data. Block 222 may be followed by block 224.

At block 224 ["Analyze A New Image With The Trained Computer Learning Model"], a new image of the pavement in the environment may be analyzed with the trained computer learning model. Block 224 may be followed by block 226.

At block 226 ["Estimate A Pavement Condition Of The Pavement In The New Image"], a pavement condition of the pavement in the new image may be estimated by the computer learning model. The estimated pavement condition may be output to a user, e.g., on a display device. Alternatively or additionally, a warning or advisory may be issued with respect to a particular roadway or section thereof of which the pavement that is included in the new image is a part based on the estimated pavement condition. For instance, if the estimated pavement condition is wet, snow, slush, or ice, or is represented by a grip coefficient less than a threshold value such that the roadway of which the pavement is a part has reduced traction, an electronic sign near the roadway may output a message to any vehicles traveling on the roadway regarding the reduced traction on the roadway. Alternatively or additionally, a pavement weather safety classification may be determined based on the estimated pavement condition, as described in more detail with respect to FIG. 2C.

The images used to train the computer learning model and/or the new image do not require any specific types of image processing, although such methods may be employed to improve estimation accuracy or speed up runtime.

Estimating the pavement condition of the pavement in the new image may include estimating a qualitative or a quantitative measurement of the pavement in the new image. For instance, estimating a quantitative measurement of the pavement may include estimating a grip coefficient of the pavement at the time of capture of the new image. In these and other embodiments, estimating the grip coefficient of the pavement may include solving a regression problem. Estimating a quantitative measurement as the pavement condition may require that the images used to train the computer learning model be labeled with quantitative pavement conditions.

The method 220 may further include capturing each image in the set of images with an image capture device located in a vicinity of the pavement in the environment. Each image may be captured at a corresponding known time of capture. The method 220 may further include measuring the condition of the pavement temporally near to the corresponding known time of capture of each image with a condition sensor located in the vicinity of the pavement The method 220 may further include automatically labeling each image with a corresponding temporally near measured pavement condition as the corresponding pavement condition of the corresponding image.

As another example, the method 220 may further include capturing each image in the set of images under ambient light conditions.

The images used to train the computer learning model and/or the new image do not require any specific types of image processing, although such methods may be employed to improve estimation accuracy or speed up runtime.

Figure 2C:
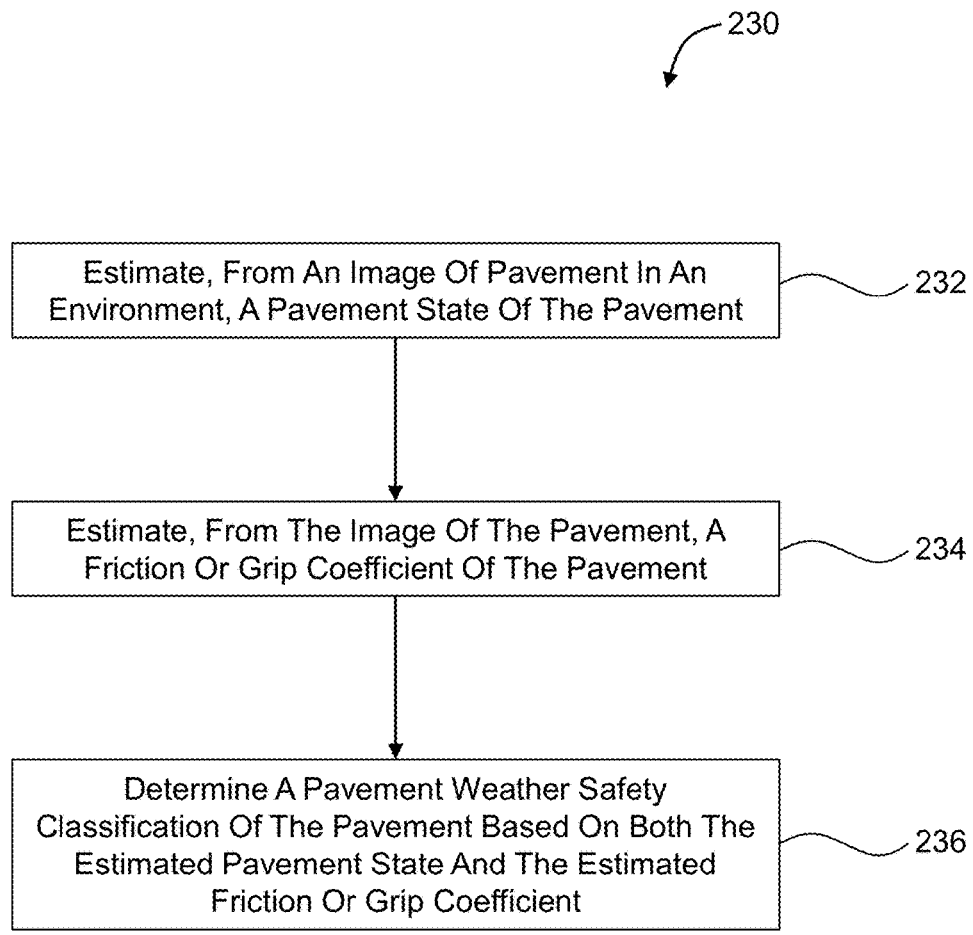
FIG. 2C is a flowchart of an example method to estimate road weather safety or hazard conditions.

FIG. 2C is a flowchart of an example method 230 to estimate road weather safety or hazard conditions, arranged in accordance with at least one embodiment described herein. The method 230 may be performed, in whole or in part, in the system 100A, 100B of FIGS. 1A and 1B and/or in other systems, devices, and/or configurations. Alternatively or additionally, some or all of the method 230 may be controlled by a computer or processor device, such as the processor 128A, 128 of FIGS. 1A and 1B or the computing device 500 or processor 504 of FIG. 5. The method 230 may include one or more of blocks 232, 234, and/or 236. The method 230 may begin at block 232.

In block 232 ["Estimate, From An Image Of Pavement In An Environment, A Pavement State Of The Pavement"], a pavement state of pavement may be estimated from an image of the pavement in an environment. Pavement state is an example of a pavement condition that may be selected from a set of possible conditions. For example, the pavement state may include Dry, Moist, Wet, Slushy, Snow, or Icy (or Ice). Further, the pavement state may be estimated according to any of the methods described herein, such as the methods 132, 200, and/or 220 of FIGS. 1C, 2A, and/or 2B. For example, the pavement state may be estimated by a first computer learning model trained to recognize complex relationships between images of the pavement and the pavement state. Block 232 may be followed by block 234.

In block 234 ["Estimate, From The Image Of The Pavement, A Friction Or Grip Coefficient Of The Pavement"], a friction or grip coefficient of the pavement may be estimated from the image of the pavement. Friction or grip coefficient is another example of a pavement condition that may be determined from a set of possible conditions. For example, the friction or grip coefficient may have a value greater than zero, or a value in a range from near zero to greater than one. Further, the friction or grip coefficient may be estimated according to any of the methods described herein, such as the methods 132, 200, and/or 220 of FIGS. 1C, 2A, and/or 2B. For example, the friction or grip coefficient may be estimated by a second computer learning model trained to recognize complex relationships between images of the pavement and the friction or grip coefficient. Block 234 may be followed by block 236.

In block 236 ["Determine A Pavement Weather Safety Classification Of The Pavement Based On Both The Estimated Pavement State And The Estimated Friction Or Grip Coefficient"], a pavement weather safety classification of the pavement may be determined based on both the estimated pavement state and the estimated friction or grip coefficient. Making this determination based on both estimates (e.g., the estimated pavement state and the estimated friction or grip coefficient) may leverage the diversity of the two estimates which may provide additional sources of information to produce an overall image-based pavement weather safety classification.

The pavement weather safety classification based on both estimates may be determined using an algorithm, crisp logic, and/or fuzzy logic. If crisp or fuzzy logic is used, one or more associated hard or soft decision thresholds may be chosen according to a priori or expert knowledge, taken to be a statistical parameter such as a mean or median of a historical sample distribution (e.g., where the historical sample includes the labeled images used to train the corresponding computer learning model), or may employ Bayesian decision theory or other similar statistical approaches.

An example algorithm that may be implemented to determine the pavement weather safety classification based on both estimates may include determining the pavement weather safety classification is "danger" if the estimated pavement state has a first value (e.g., Wet, Slushy, Snow, or Icy) and the estimated grip coefficient is less than a first threshold. The first threshold may be 0.45 or some other value. The pavement weather safety classification according to this example algorithm may be determined to be "caution" if either (1) the estimated pavement state has the first value and the estimated friction or grip coefficient is greater than the first threshold, or (2) the estimated pavement state has a second value (e.g., Dry or Moist) and the estimated friction or grip coefficient is less than a second threshold that is greater than the first threshold. The second threshold may be 0.60 or some other value. The pavement weather safety classification according to this example algorithm may be determined to be "safe" if the estimated pavement state has the second value and the estimated friction or grip coefficient is greater than the second threshold. The following pseudo code embodies the foregoing example algorithm.

Input: Estimate of road state (e.g., 'dry', 'moist', 'wet', 'slushy', 'snow', 'icy') and estimate of surface grip coefficient Output: Pavement weather safety classification (e.g., 'safe', 'caution', 'danger')

if road state estimate is 'wet', 'slushy', 'snow', or 'icy' and grip coefficient estimate is less than 0.45, then output 'danger' if road state estimate is 'wet', 'slushy', 'snow', or 'icy' and grip coefficient estimate is greater than or equal to 0.45, then output 'caution' if road state estimate is 'dry' or 'moist' and grip coefficient estimate is greater than or equal to 0.60, then output 'safe' if road state estimate is 'dry' or 'moist' and grip coefficient estimate is less than 0.60, then output 'caution'

Other embodiments of the method 230 of FIG. 2C that implement an algorithmic approach may implement the same or a different algorithm.

The determined pavement weather safety classification may be output to one or more users, e.g., on a display device or through a wired or wireless transmission. Alternatively or additionally, a warning or advisory may be issued with respect to a particular roadway or section thereof of which the pavement that is included in the new image is a part based on the determined pavement weather safety classification. For instance, if the determined pavement weather safety classification is "danger" or "caution", an electronic sign near the roadway may output a message to any vehicles traveling on the roadway regarding the determined pavement weather safety classification.

Figure 3:
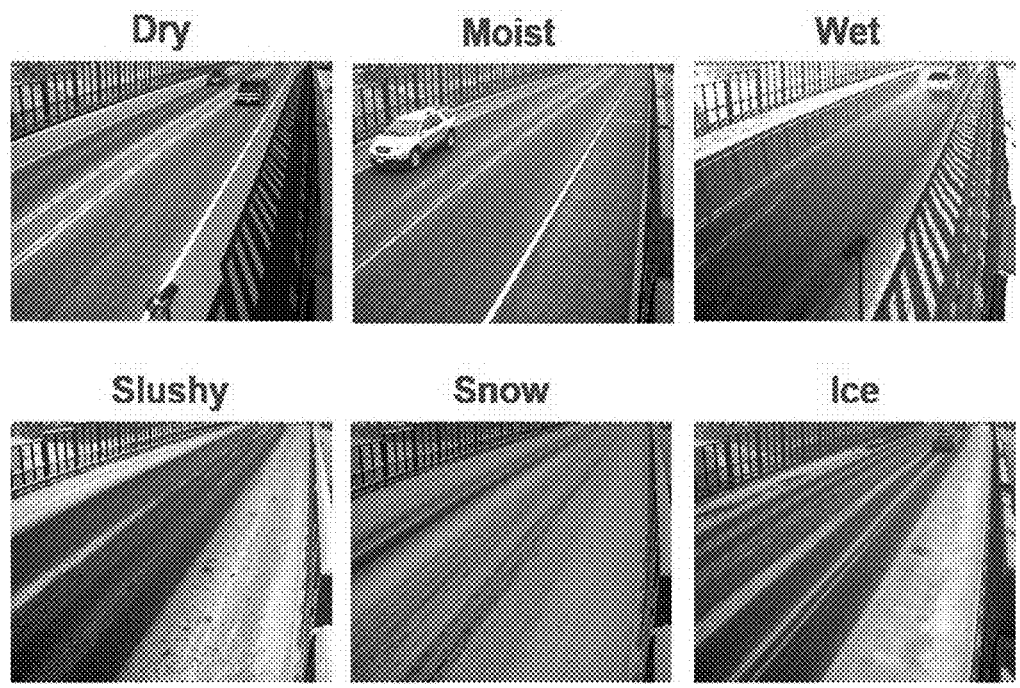
FIG. 3 includes camera images from a Colorado site used in an experiment relating to image-based estimation of weather-related pavement conditions of pavement.

An experiment was performed to demonstrate and prove the concept of the approach of the methods 132 and/or 220 of FIGS. 1B and 2B. A total of 199 camera images were collected during daylight hours (0900-1600) during a three-month period spanning November 2016 to January 2017 from one camera at a Road Weather Information System (RWIS) station in Louisville, Colo. FIG. 3 includes six camera images from the Colorado site, each labeled with a different one of six possible pavement conditions, arranged in accordance with at least one embodiment described herein.

The 199 camera images were randomly selected from a database and labeled with one of the six possible pavement conditions, e.g., "dry", "moist", "wet", "slushy", "snow", or "ice", using data (e.g., measured pavement conditions) collected from a co-located Vaisala DSC-111 condition sensor The DSC-111 pavement condition closest in time to each image's time of capture was used as the pavement condition label for each corresponding image. An approximately equal number of images were selected for each of the six possible pavement conditions, with fewer used for the "ice" pavement condition due to fewer occurrences of an "ice" pavement condition observed during the data collection period.

Of the 199 camera images, some of them as raw RGB camera images stored in JPEG format were used for training a computer learning model implemented as a CNN. Other RGB camera images of the 199 camera images, also as raw RGB camera images stored in JPEG format, were reserved for testing. Since the camera images used for both training and testing were unprocessed, various ambient lighting and phenomena were observed, such as shadows, vehicle traffic, bridge infrastructure, snowplow operations, surrounding sky, other ground surfaces, and natural lighting variations.

The CNN was constructed and trained. The following table describes the CNN used in this experiment. The same, similar, or different CNNs may be implemented in other embodiments described herein.

TABLE 1

CNN Model Used in Experiment

| Layer | Input | Output |
| --- | --- | --- |
| Input |  | (150, 150, 3) |
| CNN_2d (3, 3, 3, 32) | (150, 150, 3) | (75, 75, 32) |
| Max pooling (2, 2) |  |  |
| CNN_2d (3, 3, 32, 32) | (75, 75, 32) | (38, 38, 32) |
| Max pooling (2, 2) |  |  |
| CNN_2d (3, 3, 64, 128) | (38, 38, 32) | (19, 19, 64) |
| Max pooling (2, 2) |  |  |
| Flatten layer | (19, 19, 64) | 128 |
| Softmax layer | 128 | 6 |

In this example, the CNN has three convolutional layers. The input data to the CNN model consists of a camera image of size 150 by 150 pixels in the vertical and horizontal axes for each of three color channels red, green, and blue. The output consists of probabilities that the input image belongs to each of six possible pavement states, or pavement conditions, of Dry, Moist, Wet, Slushy, Icy (or Ice), or Snow.

A GPU in the Amazon Web Services cloud platform was used for the CNN. A subset of the overall dataset was reserved and labels removed for testing. In particular, 145 camera images with pavement condition labels were used to train the CNN. The remaining 44 camera images without pavement condition labels were analyzed by the CNN to generate an estimate of the pavement condition in each of the remaining camera images. The 44 camera images included images for each of the six possible pavement conditions (e.g., pavement states) and will be referred to hereafter as the test camera images. The estimated pavement conditions were then compared to the measured pavement conditions for the test images to determine the pavement condition estimation accuracy.

Figure 4:
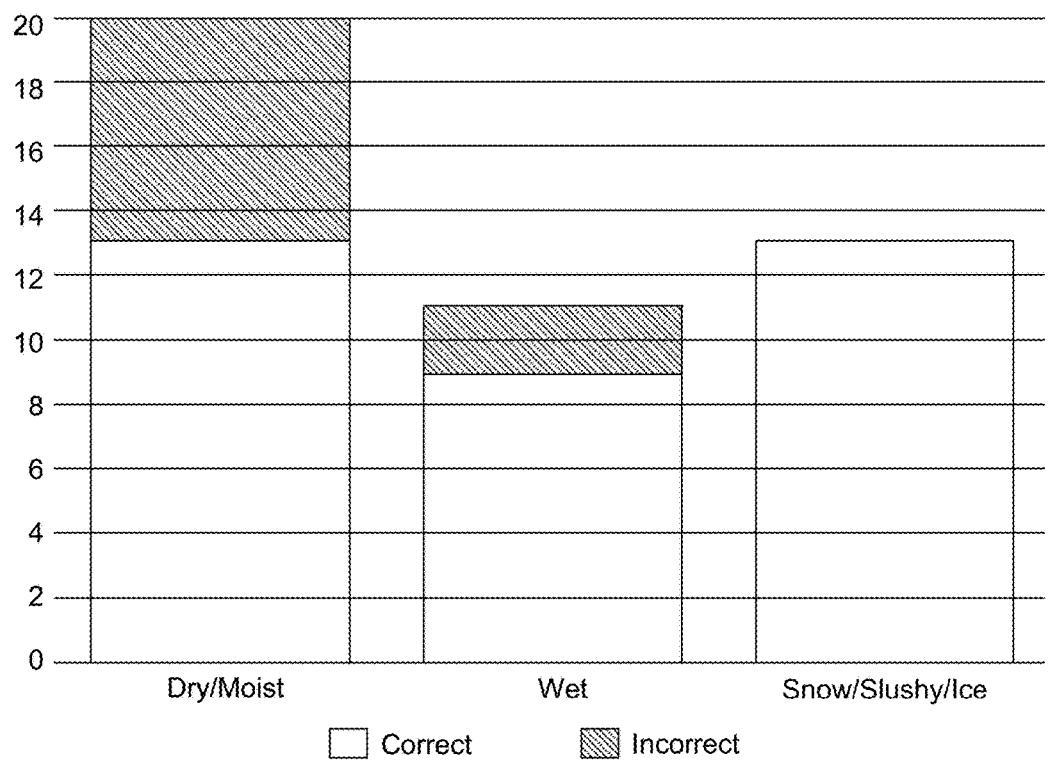
FIG. 4 is a column chart showing pavement condition estimation accuracy of the method implemented in the experiment.

FIG. 4 is a column chart showing the pavement condition estimation accuracy with respect to a combination of the six possible pavement conditions for the test camera images, arranged in accordance with at least one embodiment described herein. In this example, some close/related pavement conditions (or pavement states) were combined for the analysis to result in a total of three combined pavement conditions or pavement states. In particular, Dry and Moist were combined (labeled "Dry/Moist" in FIG. 4) and Snow, Slushy, and Ice were combined (labeled "Snow/Slushy/Ice" in FIG. 4). In FIG. 4, the vertical axis represents number of test images of the test images with the three combined pavement conditions or pavement states (e.g., Dry/Moist, Wet, Snow/Slushy/Ice) distributed across the horizontal axis. The empty boxes represent the number of correct estimates for a given one of the three combined pavement conditions while the patterned boxes represent the number of incorrect estimates for the given one of the three combined pavement conditions. For example, 13 test images were correctly estimated as Dry or Moist, 7 test images were incorrectly estimated as Dry or Moist, 9 test images were correctly estimated as Wet, 2 test images were incorrectly estimated as Wet, and 13 test images were correctly estimated as Snow/Slushy/Ice. As can be determined from FIG. 4, the overall pavement condition estimate accuracy across all of the combined pavement conditions is 80% for this particular experiment.

Figure 5:
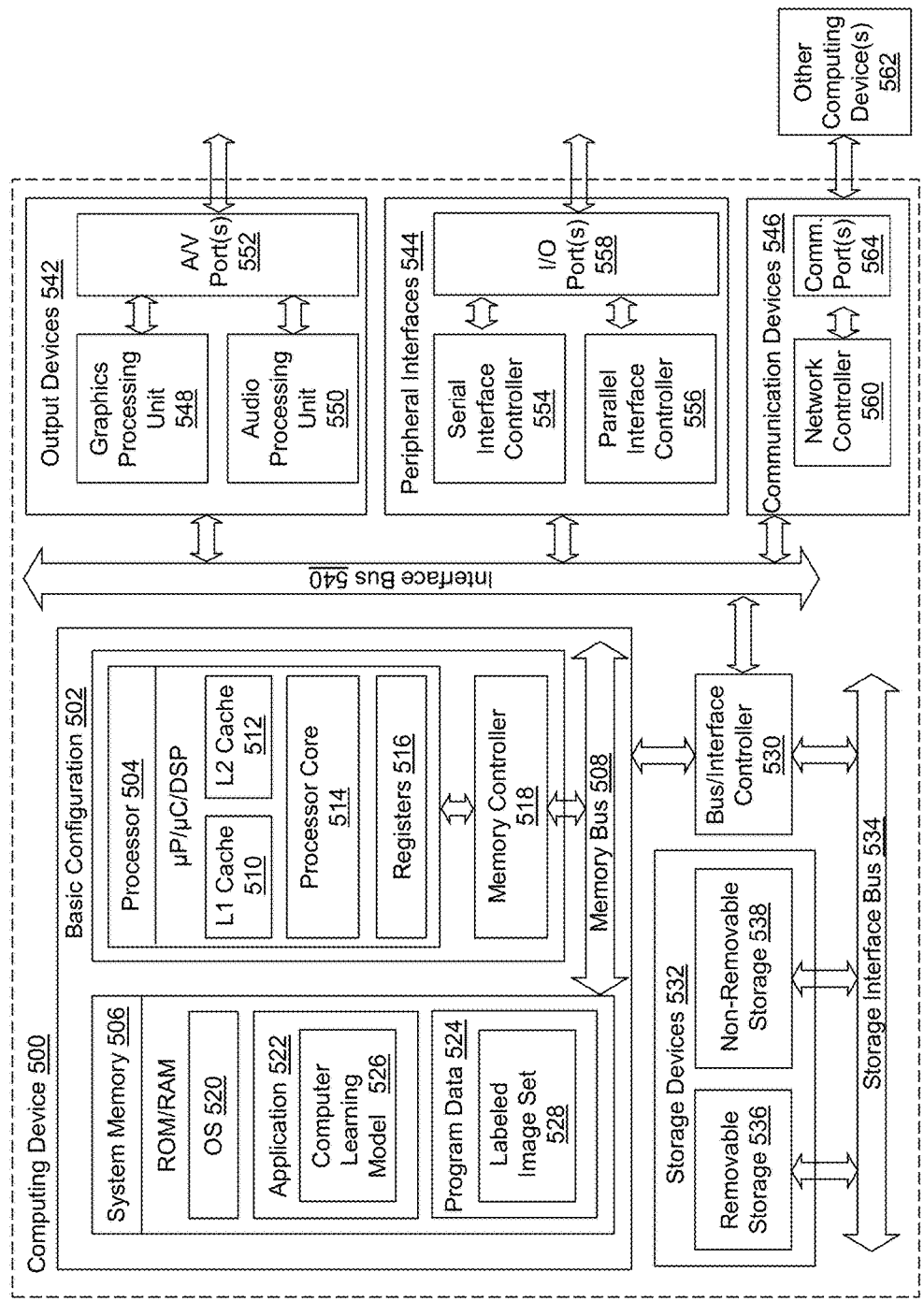
FIG. 5 illustrates a block diagram of an example computing device, all arranged in accordance with at least one embodiment described herein.

FIG. 5 illustrates a block diagram of an example computing device 500, in accordance with at least one embodiment of the present disclosure. The computing device 500 may be used in some embodiments to perform or control performance of one or more of the methods and/or operations described herein. For instance, the computing device 500 may be communicatively coupled to and/or included in the system 100A, 100B of FIGS. 1A and/or 1B to perform or control performance of the method 200, 220, and/or 230 of FIGS. 2A, 2B, and/or 2C. Alternatively or additionally, the computing device 500 may include or correspond to the computer platform 126 of FIG. 1B. In a basic configuration 502, the computing device 500 typically includes one or more processors 504 and a system memory 506. A memory bus 508 may be used for communicating between the processor 504 and the system memory 506.

Depending on the desired configuration, the processor 504 may be of any type, such as a GPU, a microprocessor (µP), a microcontroller (µC), a digital signal processor (DSP), or any combination thereof. The processor 504 may include one or more levels of caching, such as a level one cache 510 and a level two cache 512, a processor core 514, and registers 516. The processor core 514 may include an arithmetic logic unit (ALU), a floating point unit (FPU), a digital signal processing core (DSP Core), or any combination thereof. An example memory controller 518 may also be used with the processor 504, or in some implementations, the memory controller 518 may be an internal part of the processor 504.

Depending on the desired configuration, the system memory 506 may be of any type, such as volatile memory (such as RAM), non-volatile memory (such as ROM, flash memory, or the like), or any combination thereof. The system memory 506 may include an operating system 520, one or more applications 522, and program data 524. The application 522 may include a computer learning model 526 that is arranged to be trained to recognize complex relationships and to estimate pavement conditions measure therapeutic radiation dosimetry. The program data 524 may include labeled image set 528 that may include or correspond to the labeled image set 120 of FIGS. 1B and 1C. In some embodiments, the application 522 may be arranged to operate with the program data 524 on the operating system 520 to perform one or more of the methods and/or operations described herein, including those described with respect to FIGS. 1C-2C.

The computing device 500 may include additional features or functionality, and additional interfaces to facilitate communications between the basic configuration 502 and any other devices and interfaces. For example, a bus/interface controller 530 may be used to facilitate communications between the basic configuration 502 and one or more data storage devices 532 via a storage interface bus 534. The data storage devices 532 may include removable storage devices 536, non-removable storage devices 538, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer-readable instructions, data structures, program modules, or other data.

The system memory 506, the removable storage devices 536, and the non-removable storage devices 538 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., output devices 542, peripheral interfaces 544, and communication devices 546) to the basic configuration 502 via the bus/interface controller 530. The output devices 542 include a graphics processing unit 548 and an audio processing unit 550, which may be configured to communicate to various external devices such as a display or speakers via one or more A/V ports 552. The peripheral interfaces 544 include a serial interface controller 554 or a parallel interface controller 556, which may be configured to communicate with external devices such as input devices (e.g., keyboard, mouse, pen, voice input device, touch input device, and/or others), sensors, or other peripheral devices (e.g., printer, scanner, and/or others) via one or more I/O ports 558. The communication devices 546 include a network controller 560, which may be arranged to facilitate communications with one or more other computing devices 562 over a network communication link via one or more communication ports 564.

The network communication link may be one example of a communication media. Communication media may typically be embodied by computer-readable instructions, data structures, program modules, or other data in a modulated data signal, such as a carrier wave or other transport mechanism, and may include any information delivery media. A "modulated data signal" may be a signal that includes one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term "computer-readable media" as used herein may include both storage media and communication media.

The computing device 500 may be implemented as a portion of a small-form factor portable (or mobile) electronic device such as a cell phone, a personal data assistant (PDA), a personal media player device, a wireless webwatch device, a personal headset device, an application-specific device, or a hybrid device that include any of the above functions. The computing device 500 may also be implemented as a personal computer including both laptop computer and non-laptop computer configurations.

The present disclosure is not to be limited in terms of the particular embodiments described herein, which are intended as illustrations of various aspects Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of this disclosure. It is also to be understood that the terminology used herein is for the purpose of describing particular embodiments only, and is not intended to be limiting.

The present disclosure is not to be limited in terms of the particular embodiments described herein, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of this disclosure. Also, the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, and/or A, B. and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that include A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

For any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, and/or others. As a non-limiting example, each range discussed herein can be readily broken down into a lower third, middle third and upper third, etc. All language such as "up to," "at least," and the like include the number recited and refer to ranges which can be subsequently broken down into sub ranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, various embodiments of the present disclosure have been described herein for purposes of illustration, and various modifications may be made without departing from the scope and spirit of the present disclosure. Accordingly, the various embodiments disclosed herein are not intended to be limiting That which is claimed:

1. A method, comprising:
    accessing a first data set generated by a first instrument and a second data set generated by a second instrument different than the first instrument, wherein:
        the first data set includes first observations by the first instrument of a subject under observation;
        the second data set includes second observations by the second instrument of the subject;
        the first observations are of a different type than the second observations and include conditions of the subject at points in time at which the first observations are made; and
        each condition of the subject at a corresponding point in time at which the corresponding first observation is made is selected from a set of possible conditions;
    automatically labeling the second data set based on the first data set;
    training a computer learning model with the labeled second data set to recognize complex relationships between the second observations and conditions in the set of possible conditions;
    analyzing, with the trained computer learning model, a third data set that includes a third observation by the second instrument of the subject; and
    based on the analyzing, estimating a condition of the subject in the third observation, the estimated condition selected from the set of possible conditions.

2. The method of claim 1, wherein automatically labeling the second data set based on the first data set includes automatically labeling each second observation with the corresponding condition of the subject included in a corresponding one of the first observations made temporally near in time to the second observation.

3. The method of claim 1, wherein only one of:
    the first observations made by the first instrument include liquid water equivalent value measurements made by a surface precipitation gauge of a surface included in the subject, the second observations made by the second instrument include images of the atmosphere included in the subject, and estimating the condition of the subject in the third observation includes estimating a liquid water equivalent value of the subject from a new image of the atmosphere;
    the first observations made by the first instrument include light measurements made by a surface lighting sensor of the subject, the second observations made by the second instrument include images of the atmosphere included in the subject, and estimating the condition of the subject in the third observation includes estimating impending lightning activity in the atmosphere of the subject from a new image of the atmosphere; or
    the first observations made by the first instrument include point observations made by an Automated Surface Observation Station (ASOS) of an ASOS site included in the subject, the second observations made by the second instrument include images of the ASOS site made by an imaging device mounted to an aircraft that flies over the ASOS site, and estimating the condition of the subject in the third observation includes estimating an ASOS observation of the ASOS site from a new image of the ASOS site.

4. The method of claim 1, wherein:
    the first observations made by the first instrument include a set of pavement conditions observed by a condition sensor of pavement included in an environment in the subject;

the second observations made by the second instrument include a set of images of the pavement in the environment;

the training comprises training the computer learning model with the set of images of the pavement in the environment, each image in the set of images labeled with a corresponding pavement condition in the set of pavement conditions, to recognize complex relationships between the set of images and the set of pavement conditions;

the analyzing comprises analyzing a new image of the pavement in the environment with the trained computer learning model; and the estimating comprises estimating a pavement condition of the pavement in the new image based on the analyzing.

5. The method of claim 4, wherein estimating the pavement condition of the new image comprises estimating a quantitative representation of pavement condition associated with a time of capture of the new image.

6. The method of claim 5, wherein estimating the quantitative representation comprises estimating a grip or friction coefficient of the pavement.

7. The method of claim 6, wherein estimating the grip or friction coefficient of the pavement comprises solving a regression problem.

8. The method of claim 4, wherein training the computer learning model with the set of images comprises training the computer learning model with raw image data.

9. The method of claim 8, wherein training the computer learning model with raw image data comprises at least one of:

training the computer learning model with images that are unmodified from their captured states;

training the computer learning model with images that include both the pavement and other features in the environment apart from the pavement; or training the computer learning model without identifying or extracting features of the images prior to the training.

10. The method of claim 4, further comprising capturing each image in the set of images under ambient light conditions.

11. The method of claim 4, wherein training the computer learning model with the set of images comprises training a convolutional neural network (CNN) configured to accurately and efficiently learn patterns in digital image data of the set of images without prior manual selection and extraction of features from the digital image data.

12. A non-transitory computer-readable medium having computer-readable instructions stored thereon that are executable by a processor device to perform or control performance of the method of claim 1.

13. A system, comprising:

a first data set generated by a first instrument, the first data set including first observations by the first instrument of a subject under observation, the first observations including conditions of the subject at points in time at which the first observations are made, wherein each condition of the subject at the corresponding point in time at which the corresponding first observation is made is selected from a set of possible conditions;

a second data set generated by a second instrument different than the first instrument, the second data set including second observations by the second instrument of the subject, the first observations being of a different type than the second observations, the second data set labeled based on the first data set; and a computer learning model that has access to the first data set and the second data set, wherein:

the computer learning model is trainable with the first data set and the second data set to recognize complex relationships between the second data set and conditions in the set of possible conditions; and the trained computer learning model is configured to:

analyze a third data set that includes a third observation by the second instrument of the subject; and based on the analysis, estimate a condition of the subject.

14. The system of claim 13, wherein:

the first data set generated by the first instrument includes a set of pavement conditions generated by a condition sensor of pavement included in an environment in the subject;

the second data set generated by the second instrument includes a set of images of the pavement in the environment, each image in the set of images labeled with a corresponding pavement condition in the set of pavement conditions;

the computer learning model has access to the set of images and the set of pavement conditions, the computer learning model being trainable includes the computer learning model being trainable with the set of images and the set of pavement conditions to recognize complex relationships between the set of images and the set of pavement conditions;

the trained computer learning model being configured to analyze the third data set includes the trained computer learning model being configured to analyze a new image of the pavement in the environment; and the trained computer learning model being configured to estimate the condition includes the trained computer learning model being configured to estimate a pavement condition of the pavement in the new image based on the analysis.

15. The system of claim 14, wherein the estimated pavement condition comprises an estimated quantitative representation of pavement condition associated with a time of capture of the new image.

16. The system of claim 15, wherein the quantitative representation comprises a grip or friction coefficient of the pavement.

17. The system of claim 14, further comprising:

the second instrument, wherein the second instrument includes a camera located in a vicinity of the pavement in the environment and configured to capture each image in the set of images, wherein each image is captured at a corresponding known time of capture;

the first instrument, wherein the first instrument includes the condition sensor located in the vicinity of the pavement and configured to measure the condition of the pavement temporally near to the corresponding known time of capture of each image; and a processor communicatively coupled to the camera and the condition sensor and configured to automatically label each image with a corresponding temporally near measured condition as the corresponding pavement condition of the corresponding image.

18. The system of claim 17, wherein the condition sensor comprises a remote condition sensor.

19. The system of claim 17, wherein the condition sensor comprises an in situ condition sensor.

20. The system of claim 14, wherein the set of images comprises raw image data, the raw image data comprising at least one of:

images that are unmodified from their captured states;
images that include both the pavement and other features in the environment apart from the pavement; or
unprocessed image data devoid of extracted features.

21. The system of claim 20, wherein the other features in the environment apart from the pavement include one or more of surrounding terrain, sky, foot traffic, or vehicle traffic.

22. The system of claim 14, wherein the second instrument includes a camera located in a vicinity of the pavement in the environment and configured to capture each image in the set of images under ambient light conditions.

23. The system of claim 14, wherein the computer learning model comprises a convolutional neural network (CNN) configured to accurately and efficiently learn patterns in digital image data of the set of images without prior manual selection and extraction of features from the digital image data.

24. The system of claim 13, wherein the CNN comprises a CNN run on a graphical processing unit (GPU) in a cloud-based architecture.

* * * * *